March 29, 1966  PETER-CONRAD PRAGER  3,242,748

FRICTION GEAR

Filed Jan. 31, 1964

Inventor:
Peter-Conrad Prager
By Deaman & Deaman
Attys

United States Patent Office 3,242,748
Patented Mar. 29, 1966

3,242,748
FRICTION GEAR
Peter-Conrad Prager, Grosse Danneddelstrasse 8,
2208 Gluckstadt, Holbein, Germany
Filed Jan. 31, 1964, Ser. No. 341,597
Claims priority, application Germany, Feb. 4, 1963,
P 31,070
12 Claims. (Cl. 74—200)

Steplessly-variable friction gears of various kinds are known in which friction discs cooperate with an adjustable friction roller, the differences between them arising both in the form of the friction discs and also in the form of the friction roller.

When the friction discs assume the form of a hollow cone, however, a friction roller is no longer used to constitute the operative connection between the hollow cones, but rather a sphere is employed, which is also frequently used as the transmission member when using friction discs which are not of hollow conical shape.

The invention has the object of providing a friction gear which improves over the previously known friction gears by its simple construction.

A further object of the invention is to provide a gear which allows better regulation of the number of revolutions as compared with known gears.

A further object of the invention is to provide a gear which is steplessly variable and operates satisfactorily and yet is of simple construction with relatively simple parts.

A further object of the invention is to provide a steplessly variable gear which can transmit high moments of rotation with good efficiency and yet has compact dimensions and a simple construction.

A further object of the invention is to provide a steplessly variable friction gear which transmits high moments of rotation with little slip.

The friction gear described below, which has a steplessly-variable transmission ratio between high and low numbers of revolutions in accordance with the invention, represents a combination which includes, on the one hand, hollow cones as the driving and driven elements and, on the other hand, a friction roller as the transmission element.

This novel construction is further improved by several additional features having relation to the location of the axis of the friction roller.

A particularly advantageous embodiment of the invention consists in a steplessly variable friction gear, constructed essentially of a driving hollow cone and a driven hollow cone, whose axes of rotation are arranged as driving and driven axes and are mutually parallel, but spatially separated from one other, in which the improvement is provided that, between the two hollow cones, a transmission roller arranged at an inclination to the axes of the hollow cones is axially movably and rotatably mounted and the hollow cones contact it along two diagonally opposite hollow conical generatrix lines, wherein the means for supporting the transmission roller are adjustable in the plane defined by the axes of the hollow cones and means are provided which permit translatory movement of the transmission roller in a direction substantially perpendicular to such plane.

According to a preferred feature, the transmission roller has two partially spherical running surfaces.

According to a further advantageous embodiment, the axis of rotation of the transmission roller is inclined so that in one transmission position, preferably the middle one, it passes through the apices of the two hollow cones.

By this means, the middle transmission position is that in which the gear is adjusted to give the standard transmission ratio, from which it can be adjusted upwardly or downwardly.

According to a further advantageous feature, the partially spherical running surfaces, which may be designated as contact surfaces, represent sections of the surface of a sphere, the center of which lies on the axis of rotation of the transmission roller.

According to a further feature, the two annular contact surfaces of the transmission roller represent sections of the surfaces of two spheres, whose centers lie on the axis of rotation of the transmission roller and are spatially separated from one another.

According to a further advantageous feature, the contact surfaces of the transmission roller comprise sections of the surfaces of two spherical cones whose generatrix lines represent sections of circles, the centers of which do not lie on the axis of rotation of the transmission roller, but one on each of two normal pressure normals, which are either coincident, i.e., identical, and pass through the center of the transmission roller or are parallel to one another and are spatially separated from one another.

According to a preferred embodiment of the invention, the contact surfaces of the transmission roller comprise sections of the surfaces of two convex cones whose generatrix lines are not circular, but are for instance of hyperbolic form, their pressure normals being either coincident and passing through the center of the transmission roller or mutually parallel and spatially separated from one another.

The invention is described below, by way of the illustration only, in conjunction with a preferred embodiment illustrated in the accompanying drawing. In the drawing.

Figure 1:
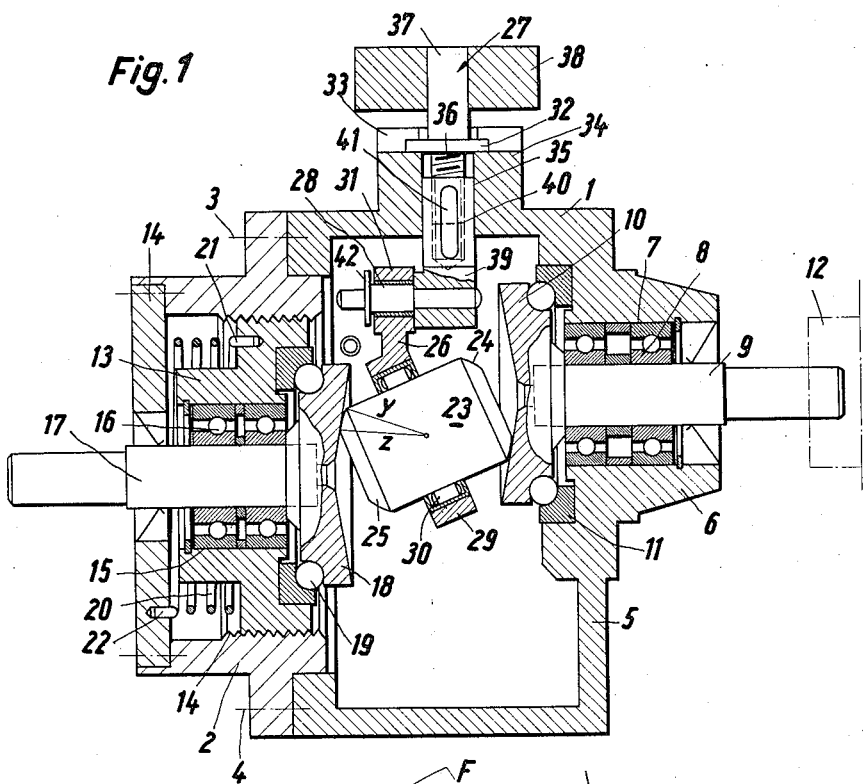
FIG. 1 shows an embodiment of a friction gear according to the invention in section.

Reference will first be made to FIG. 1. The housing for the gear consists of a part 1 with an open side, in which a closure member 2 is arranged. The parts are connected together by means of flanges and bolts 3, 4.

The housing part 1 has a projecting boss 6 on its wall 5 opposite the closure member 2, in which boss 6 having a bearing opening 7 is provided. An input shaft 9 is journalled in the opening 7 by means of bearing members 8. It carries a hollow cone 10 on its inner end, which is centered by means of the bearing members 8 and is also supported, if required, by a separate bearing 11 in the vicinity of its outer periphery. The shaft 9 is connected at its free end with a driving device 12 which is shown only diagrammatically.

A bearing member 13, which includes on its outer surface a screw thread, is adjustably mounted in the closure member 2 in an internal thread 14 formed in the closure member. This bearing member 13 has an aperture 15 in which an output shaft 17 is rotatably mounted by means of two bearings 16. This output shaft 17 carries a hollow cone 18 on its inner end which corresponds to the hollow cone 10. The hollow cone 18 can likewise be further supported, if required, by another bearing 19 in the vicinity of its periphery. The bearings 16, 19 are arranged in the bearing member 13. This is itself supported by means of a spring 20, preferably a helical spring, which is connected at its ends 21 and 22 to the bearing member 13 and to a closure plate 14 for the closure member 2, respectively. The closure plate is secured in place by means of bolts, for instance. The output shaft 17 is coupled in a manner not shown with the part which is to be driven.

The spring 20 has the purpose of allowing for the necessary adjustments in the gear. The invention also contemplates a rigid mounting for the bearing member 13 at a distance from the wall 5.

The axes of rotation of the cones 10 and 18, whose open sides are located opposite one another and are advantageously truncated and preferably have an apex angle of the magnitude indicated in the drawing, lie parallel to one another and are mutually displaced in the plane of the drawing in the embodiment illustrated. Advantageously, the input shaft 9 lies, as shown in the embodiment illustrated, above the output shaft 17. The cones preferably have straight generatrix lines.

Between the hollow cones 10 and 18, a transmission roller 23 is mounted at an inclination with respect to the axes of the shafts 9 and 17. This roller consists of a cylindrical body which has running surfaces or annular contact surfaces 24, 25 at its ends. The transmission roller 23 is arranged with such an inclination that it contacts a generatrix line of the hollow cone 10 at one side and a generatrix line of the hollow cone 18 at the other side. These generatrix contact lines are mutually parallel and lie diagonally opposite one another.

The transmission roller 23 is rotatably and adjustably mounted in an adjuster member 26. The adjuster member 26 is so held by a setting device 27 that it can be moved by it, for the purpose of alteration of the transmission ratio, between the contact lines of the two hollow cones 10 and 18, the axis of rotation of the transmission roller always remaining parallel to itself. At the same time, the adjuster member 26 is capable of compensating for the tendency of the transmission roller 23 to move laterally between the hollow cones, since it is laterally movable or translatorily adjustable, for instance, on pivotal or otherwise mounted members guided on the bearing bolt 28 of the setting device 27. The tendency of the transmission roller 23 to be drawn in dependence upon the load between the hollow cones 10 and 18 and thus automatically to adjust the power transmission correspondingly is based upon the spacing between the two contact circles on the hollow cones 10 and 18 from one another at the center of their overlapping orthogonal projections on a central plane, which is large between the hollow cones and decreases laterally, whereby a wedging effect arises, and, therefore, upon the transmission of forces acting on the transmission roller 23 increasing in dependence upon this wedging effect.

The means described are preferably so constructed that the adjuster member 26 has a bearing ring 29 with a central aperture, in which a needle bearing 30 is arranged as the bearing means. In this, the body of the transmission roller is rotatably and axially movably mounted, so that the bearing ring 29 which receives the needle bearing is arranged on the adjuster member 26 so that the angular position provided for the transmission roller is given.

The adjuster member is freely rotatably supported by means of an eyelet projection 31 located on the bearing bolt 28. This bearing bolt is located parallel to the shafts 9, 17, but is above them.

The setting device 27 has a spindle-like member, which is scured to a projection 34 on the housing 1 by means of an outwardly projecting annular flange 32 and a locking ring 33. This projection 34 has an inner aperture 35 into which a portion 36 of the member provided with an external thread projects. This portion has a smaller diameter than the aperture 35. Another portion 37 of the member projects outwardly and supports a setting knob or handle 38.

An adjusting member 39 is longitudinally movably, but nonrotatably mounted in the aperture 35. This has an upwardly open axial tapped hole 40 into which the portion 36 is screwed. The adjusting member 39 carries an axially extending key 41 on its outward side. This key is associated with an axial groove (not shown) on the inside of the aperture 35 so that longitudinal but no rotary movement is possible.

At the lower or inner end of the adjusting member 39, the bearing bolt 28 is arranged in a direction parallel to and above the shafts 9, 17. The adjuster member 26 mounted on the bolt 28 is positioned by the setting device 27 and an annular disc 42 which is provided on the bolt 28.

Pivoting of the adjuster member 26 about the bolt 28 produces translatory movement of the transmission roller in a direction substantially perpendicular to the plane of the drawing.

The aforementioned inclined position of the axis of rotation of the transmission roller 23 is such that this gives, in the middle position of the transmission roller 23, the preferred transmission ratio of 1:1 and passes through the apices of the hollow cones 10 and 18. Thus all points of the spherically ground annular contact surfaces 24, 25 of the transmission roller 23 and the contact surfaces forming the associated hollow cones establish ideal rolling ratios without involving an undesirable sliding friction, since all contact points can be appropriately adjusted to a rolling cone ABD (FIG. 2), the axis of which coincides with the axis of rotation of the transmission roller 23 and which rolls in a hollow cone ABC. At other transmission ratios, these rolling relationships are not quite so ideal.

The spherical grinding advantages exist even with arrangements where there is not a true cocenter relationship between surfaces 24 and 25. Then forces are set up under load in the contacting pressure surfaces, which exert a tilting moment on the axis of the transmission roller 23, such that this tends to be urged axially parallel to the axes of the hollow cones. This tilting moment has a disadvantageous effect on the bearing of the transmission roller 23. Preferably, two cooperating means are therefore provided which alleviate this tilting moment.

Figure 2:
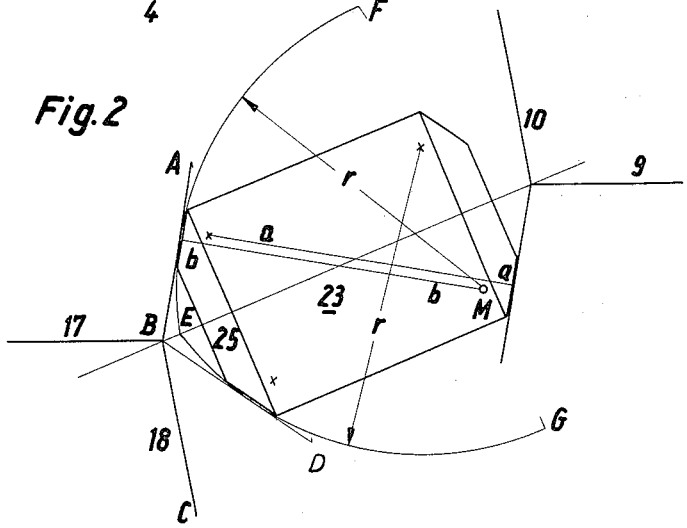
FIG. 2 shows a geometric illustration of a particularly advantageous arrangement of the friction roller.

The first means consists, as shown in FIG. 2, of grinding the two annular contact surfaces 24, 25 not as one, but as two associated spheres, the centers of which are separated from one another by a small distance. The pressure normal lines $a$—$a$ (FIG. 2) and $b$—$b$ perpendicular to the generatrices of the hollow cones are thus spaced a slight distance apart. This spacing is a lever arm, by which the actual contact force sets up an opposite, correspondingly large and likewise load-dependent tilting moment to the aforementioned tilting moment, so that the damaging forces established by the first tilting moment are relieved at the origin, namely, at the pressure surface.

The second measure consists in separating these perpendiculars, the center M of the grinding curve and the radius $r$ by magnification of the original grinding curve, which the radius of the sphere has, does not coincide with the axis of rotation of the transmission roller 23. The position for the center point M is given by displacement in the direction of inclination of the roller. For a lower running surface it lies under an imaginary line connecting the contact points. The length of the radius $r$ is at least equal to the distance between the contact points and the center of the friction roller. These conditions are illustrated in FIG. 1, in which the connecting line Z from the center of the transmission roller to the contact point is smaller than the distance Y from this center to the other position of the contact surface in the direction of the generatrix line.

Thus a true spherical surface section is no longer given, but instead a spherical cone FEG, such that the surface of the spherical cone has been adjusted to a rotation surface of a circular portion with a radius $r$ rotating about a chord. Each grinding surface has only the least spatial separation from the center of the transmission roller in the direction of the pressure normals and close to the normals, considering their slightest separation from one another. All other points of the grinding surface have a greater distance from the center.

This ensures firstly that any tilting moment is no longer effective on the position of the transmission roller 23, since any rotation of the transmission roller is prevented in the plane common to the generatrix contact lines of the hollow cones 10 and 18.

Secondly, this spherical cone grinding also causes a considerable enlargement of the pressure surfaces, which is usually undesirable with these ideal rolling ratios, but is very desirable and causes a considerable increase in the transmission load capacity.

A series of other non-circular convex grinding shapes can be conceived, for example, of a hyperbolic kind, which are all likewise suitable if, through them, the requirements for the spacings of the pressure normals and the prevention of rotation of the transmission roller 23 in the plane of the generatrix contact lines of the two hollow spheres 10 and 18 are fulfilled.

I claim:

1. A steplessly-variable friction gear, which comprises, in combination, a housing, an input shaft rotatably mounted in a wall of the housing, a first hollow cone mounted upon the inner end of the input shaft for rotation therewith and having its concave conical side directed inwardly of the housing, an output shaft rotatably mounted in a wall of the housing opposite that receiving the input shaft, a second hollow cone mounted upon the inner end of the output shaft for rotation therewith and having its concave conical side directed inwardly of the housing, the input and output shafts being mounted with their axes mutually parallel and spatially separated from one another, a transmission roller having annular contact surfaces on the opposite ends thereof, bearing means adapted to support the transmission roller between the concave conical sides of the respective hollow cones with one annular contact surface contacting each hollow cone and at an inclination thereby to guide the transmission roller at an inclination to the axes of the hollow cones and said bearing means being further adapted to permit rotation about its longitudinal axis and axial movement of the transmission roller in the direction of its longitudinal axis, the inclination of the transmission roller being adapted to cause such roller to contact the respective hollow cones with its annular contact surfaces over two diagonally opposite generatrix lines of the hollow cones, and wherein the bearing means include adjustment means for permitting adjustment of the transmission roller in the plane defined by the axes of the respective hollow cones and also include movable support means adapted to permit translatory movement of the transmission roller in a direction substantially perpendicular to the plane defined by the axes of the hollow cones.

2. A friction gear as set forth in claim 1, wherein the movable support means comprise a spindle disposed parallel to the input and output shafts and carrying the adjustment means, and means including a part embracing the bearing means and pivotably supporting the transmission roller, such part including a bearing projection with an aperture located about the spindle.

3. A friction gear as set forth in claim 1, wherein the annular contact surfaces are partially spherical.

4. A friction gear as set forth in claim 1, wherein the axis of rotation of the transmission roller, when the gear is adjusted to a transmission ratio from which it is adjusted in both directions, lies on the line intersecting the apices of the first and second hollow cones.

5. A friction gear as set forth in claim 1, wherein the annular contact surfaces of the transmission roller comprise sections of the surface of a sphere the center of which lies upon the axis of rotation of the transmission roller.

6. A friction gear as set forth in claim 1, wherein the annular contact surfaces of the transmission roller comprise sections of the surfaces of two spheres the centers of which lie on the axis of rotation of the transmission roller and are spatially separated from one another.

7. A friction gear as set forth in claim 1 wherein the annular contact surfaces of the transmission roller comprise sections of the surfaces of two spherical cones.

8. A friction gear as set forth in claim 1, wherein the annular contact surfaces of the transmission roller comprise sections of the surfaces of two spherical cones constructed to have partially-circular generatrix lines, the centers of which are displaced from the axis of rotation of the transmission roller and which lie one on each of two pressure normals which are coincident and pass through the center of the transmission roller.

9. A friction gear as set forth in claim 1, wherein the annular contact surfaces of the transmission roller comprise sections of the surfaces of two spherical cones constructed to have partially-circular generatrix lines, the centers of which are displaced from the axis of rotation of the transmission roller and which lie one on each of two pressure normals which are mutually parallel and spatially separated from one another.

10. A friction gear as set forth in claim 1, wherein the annular contact surfaces of the transmission roller are formed from sections of the surfaces of two convex cones having noncircular generatrix lines of hyperbolic shape.

11. A friction gear as set forth in claim 1, wherein the annular contact surfaces of the transmission roller are formed from sections of the surfaces of two convex cones having noncircular generatrix lines of hyperbolic shape, the contact surfaces having coincident pressure normals which pass through the center of the transmission roller.

12. A friction gear as set forth in claim 1, wherein the annular contact surfaces of the transmission roller are formed from sections of the surfaces of two convex cones having noncircular generatrix lines of hyperbolic shape, the contact surfaces having pressure normals which are mutually parallel and spatially separated from one another.

References Cited by the Examiner

UNITED STATES PATENTS

| | | | |
|---|---|---|---|
| 664,028 | 12/1900 | Ryd | 74—200 |
| 729,289 | 5/1903 | De Loach | 74—200 |
| 2,272,509 | 2/1942 | Cavallo | 74—193 |

DAVID J. WILLIAMOWSKY, *Primary Examiner.*

DON A. WAITE, *Examiner.*

L. H. GERIN, *Assistant Examiner.*